Figure 1:
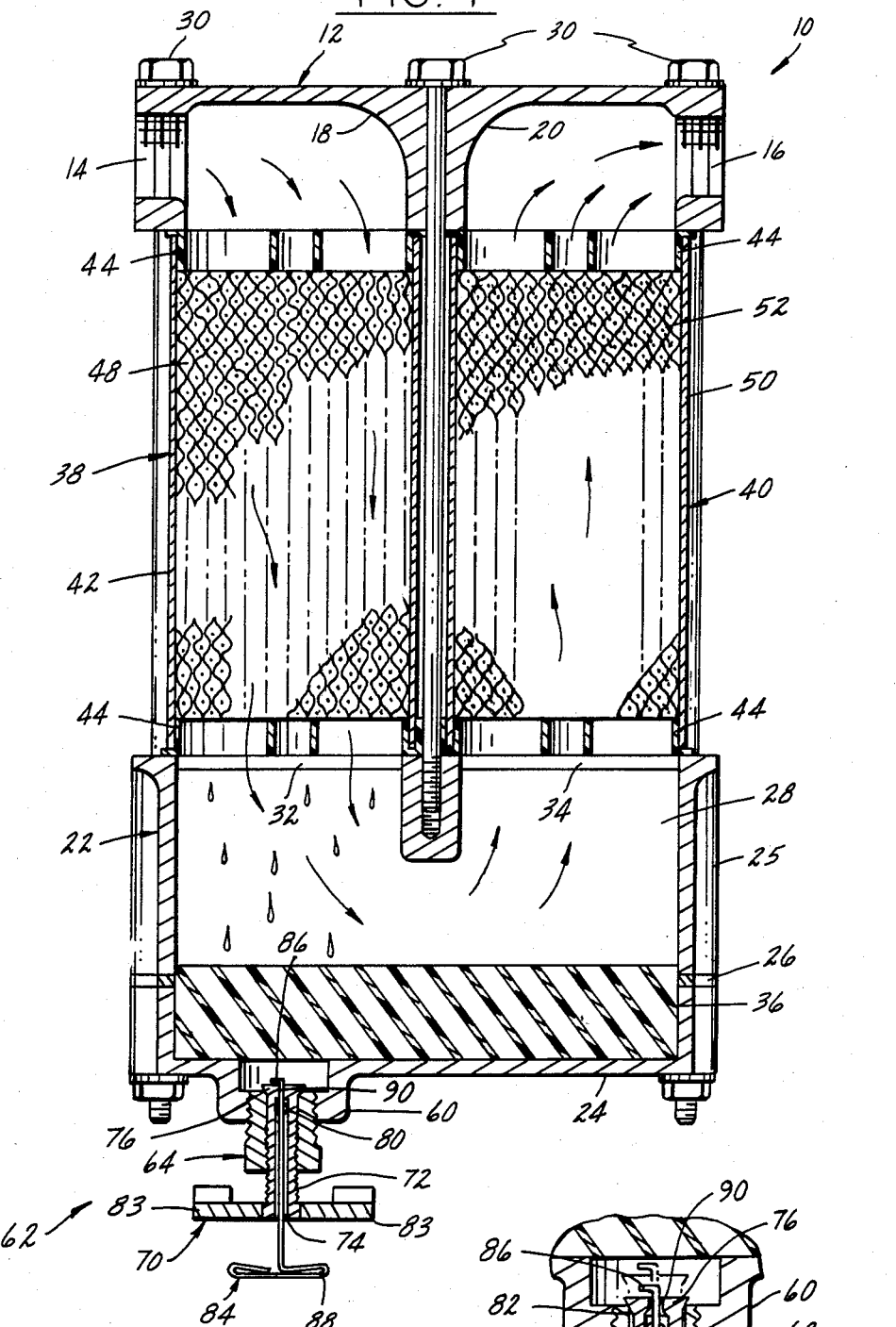

United States Patent [19]

Mann

[11] Patent Number: 4,600,416
[45] Date of Patent: Jul. 15, 1986

[54] AIR LINE VAPOR TRAP

[75] Inventor: David O. Mann, Hamilton, Ind.

[73] Assignee: La-Man Corporation, Hamilton, Ind.

[21] Appl. No.: 699,729

[22] Filed: Feb. 8, 1985

[51] Int. Cl.$^4$ ............................................. B01D 36/02
[52] U.S. Cl. ........................................ 55/323; 55/423;
 55/433; 55/482; 55/520; 55/525; 137/244
[58] Field of Search ................. 55/218, 323, 322, 327,
 55/337, 423, 482, 433, 466, 520, 525; 210/300,
 314, 316; 137/244

[56] References Cited

U.S. PATENT DOCUMENTS

| 2,204,017 | 6/1940 | Kehle | 55/321 |
| 2,459,398 | 1/1949 | Walters | 55/433 |
| 2,508,015 | 5/1950 | Dexter | 55/433 |
| 2,521,785 | 9/1950 | Goodloe | 55/482 |
| 3,791,105 | 2/1974 | Rhodes | 55/323 |
| 4,487,618 | 12/1984 | Mann | 55/323 |

FOREIGN PATENT DOCUMENTS

| 50045 | 9/1911 | Austria | 137/244 |
| 1172798 | 6/1964 | Fed. Rep. of Germany | 55/320 |

Primary Examiner—Bernard Nozick
Attorney, Agent, or Firm—Barnes, Kisselle, Raisch, Choate, Whittemore & Hulbert

[57] ABSTRACT

An in-line vapor trap for removing water and/or oil vapor from a compressed air line which includes a manifold having spaced coaxial inlet and outlet openings, a hollow base suspended from the manifold, and replaceable cartridges connecting the manifold inlet to the hollow base and connecting the hollow base to the manifold outlet. A honeycomb structure is disposed in the lower portion of the base within the enclosed volume defined thereby and cooperates with the base side and bottom walls to define a zone of substantially zero air movement for collection of liquid droplets. A depression in the base bottom wall forms a liquid sump, and a drain opens into the sump for drainage of captured liquid. This drain features a continuously open annular orifice for continuous weep-drainage of liquid under pressure. The orifice surrounds a wire having an angulated head disposed within the sump which may be rotated by an operator so as to remove dirt and debris from surrounding and clogging the annular weep orifice.

7 Claims, 2 Drawing Figures

U.S. Patent    Jul. 15, 1986    4,600,416

AIR LINE VAPOR TRAP

The present invention is directed to devices of a type adapted to remove oil and/or water vapor from a flowing gaseous medium such as compressed air, and more particularly to improved drainage of devices of this character.

U.S. Pat. No. 4,487,618 to the inventor herein and assigned to the assignee hereof discloses an in-line trap for removing water and/or oil vapor from a compressed air line which includes a manifold having spaced coaxial inlet and outlet openings and a hollow base suspended from the manifold. A first cartridge extends between the manifold inlet and the enclosed volume within the hollow base and contains a wire pad adapted to coalesce water and/or oil vapor in air passing therethrough into droplets which are then entrained by the air and carried into the base volume. An integral honeycomb structure cooperates with the bottom and side walls of the base to form a dead airspace which captures water droplets falling from air entering the enclosed volume from the first cartridge. A second cartridge, which includes spirally wound fiber and wire mesh materials, directs compressed air from within the enclosed base volume to the manifold outlet and simultaneously functions to remove any remaining vapor therefrom.

In a commercial embodiment of the device disclosed in the referenced patent marketed by applicant's assignee under the trademark EXTRACTOR, a depression in the bottom wall of the base forms a liquid sump for collection of water and/or oil removed from the compressed air. A conventional drain mechanism, including a T-shaped draincock, is mounted in the base wall depression for selectively draining liquid collected therein.

An object of the present invention is to provide a trap for removing oil and/or water vapor from a compressed air line of the described character wherein the drain is continuously but minutely open during operation so as to permit continuous weepage or drainage of liquid under compressed air pressure without substantially reducing pressure in the main air line, and which includes facility for removing dirt and debris from the minute drain opening so as to prevent or remedy drain blockage.

Another object of the invention is to provide a trap with drain of the described character which also includes facility for macro or large-scale drainage of trapped liquid.

Figure 2:
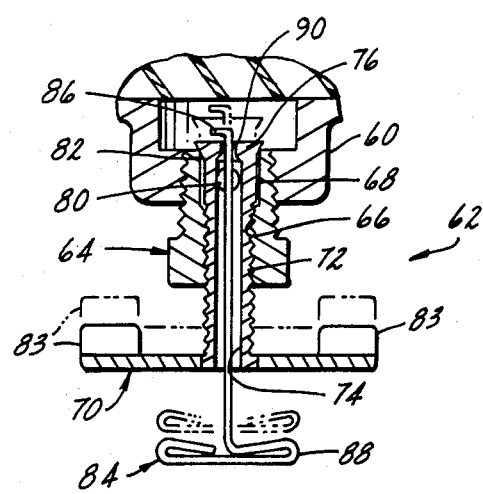

The invention, together with additional objects, features and advantages thereof, will be best understood from the following description, the appended claims and the accompanying drawings in which:

FIG. 1 is an elevational bisectional view taken in a vertical plane through the vapor trap of the invention; and FIG. 2 is a fragmentary view of the trap of FIG. 1 featuring the drain mechanism on an enlarged scale.

The disclosure of above-noted U.S. Pat. No. 4,487,618 is incorporated herein by reference.

FIG. 1 illustrates a presently preferred embodiment 10 of a vapor trap in accordance with the present invention as comprising a cap or manifold 12 having oppositely directed and coaxially aligned internally threaded openings 14,16 respectively defining an inlet and outlet adapted for in-line connection to a gas line such as a compressed air line. A concave internal surface 18 on manifold 12 internally opposed to inlet opening 14 directs inlet air orthogonally of the inlet axis, or downwardly in the orientation of FIG. 1. In the same manner, a concave surface 20 opposed to outlet opening 16 receives and directs upwardly flowing air to outlet opening 16. A hollow base 22 of generally rectangular construction comprises a bottom wall plate 24 and a continuous peripheral side wall 25 peripherally contiguous with bottom wall plate 24 and separated therefrom by the gasket 26. Base 22 thus forms an enclosed volume 28 suspended beneath and fastened to manifold 12 by the bolts 30. A pair of laterally spaced circular openings 32,34 are formed in base 22 in respective alignment in assembly with the inlet and outlet of manifold 12. An integral honeycomb structure 36 is disposed in the lower portion of enclosed volume 28 adjacent to bottom wall plate 24 and cooperates with the side and bottom walls of enclosure 22 to define a zone of substantially zero air movement adjacent to the enclosure bottom wall. It will be noted in FIG. 1 that the combs or cavities of honeycomb structure 36 are angulated upwardly and to the left, that is toward inlet opening 14.

A pair of laterally spaced replaceable vaporizer cartridges 38,40 are clamped by bolts 30 between manifold 12 and base 22 in sealing engagement therewith. Cartridge 38, which is clamped in axial alignment between the inlet section of manifold 12 and opening 32 in base 22, comprises a cylindrical cartridge outer wall 42 and an axially spaced pair of open end gaskets 44 clamped in sealing engagement with manifold 12 and base 22 respectively. Within wall 42, cartridge 38 comprises a mass or pad 48 of wire mesh fibers of a type adapted to coalesce water or oil vapor passing therethrough into vapor droplets. Pad 48 in the preferred embodiment of the invention comprises a so-called "Goodloe column packing" of a type disclosed in U.S. Pat. No. 2,521,785. The dimension of cartridge 38 cross-sectional to air flow is substantially less than that of the enclosed volume 28 within base 22. Cartridge 40, which is clamped in axial alignment between the outlet portion of manifold 12 and base opening 34, comprises an outer cylindrical wall 50 and a pair of end gaskets 44 in respective sealing engagement with manifold 12 and base 22. Within cartridge wall 50 and between end gaskets 44, and filling the entire cartridge volume, is a plug structure 52 of alternating spiral layers of wire mesh or screen and absorbent fabric.

In operation of trap 10 to the extent thus far described, which is similar in most important respects to that disclosed in U.S. Pat. No. 4,487,618 referenced hereinabove, air with entrained water and/or oil vapor is received through inlet opening 14 and directed by surface 18 downwardly into and through cartridge pad 48. During such passage through pad 48, the water and/or oil vapors are coalesced into droplets which are entrained in the flowing air mass and carried thereby into the open volume 28 within base 22. Since the cross-sectional dimension to air flow within volume 28 is greater than that within cartridge 38, the velocity of air entering the open base is reduced, and the entrained droplets fall by gravity and centrifugal force toward the lower portion of the base. Such droplets are captured within the essentially dead airspace formed by honeycomb structure 36, with the angulated orientation of the honeycomb structure in a direction opposite to the general direction of air flow serving to enhance such trapping action. Since the construction of honeycomb structure 36 prevents substantial air movement therewithin, revaporization is substantially eliminated. In the meantime, the compressed air stream, which is now 75% to 95% dry, is fed from enclosed volume 28 through opening 34 into cartridge 40. As the air passes upwardly through the fiber/mesh plug 52 toward outlet 16, any remaining vapor is removed by the fibrous plug material.

In accordance with the present invention, a depression 60 is formed in bottom wall plate 24, beneath honeycomb structure 36 and the dead air space provided thereby, to serve as a sump for liquid removed from the compressed air stream. A drain 62 is mounted to and depends from sump 60. Drain 62 comprises a drain collar 64 having an external surface threaded into a corresponding opening at the low point of sump 60, and an internal bore 66 having a threaded portion remote from sump 60 and a radially enlarged portion 68 (FIG. 2) immediately adjacent to sump 60. A drain cock 70 includes a hollow tubular body 72 threaded into collar 64, with an internal drain passage 74 passing axially therethrough. Tubular body 72 has an enlarged head 76 disposed within sump 60. A lateral passage 80 extends through drain cock body 72 immediately adjacent to head 76 from internal drain passage 74 to enlarged bore portion 68 of collar 64. A pair of opposed complementary conical seats 82 are formed on head 76 and collar 64. A pair of oppositely projecting wings 83 are integral with draincock body 72 remotely of sump 60 and facilitate rotation of the draincock into and out of collar 64. Thus, with draincock 70 threaded into collar 64 and sump depression 60 in the phantom position illustrated in FIG. 2, the sump communicates with drain passage 74, through enlarged bore portion 68 and radial passage 80, so as to drain collected liquid from the sump. On the other hand, with draincock 70 in the position shown in solid lines in the drawing and head 76 seated at 78 against the opposing surface of collar 64, such communication and drainage is inhibited. Drain 62 to the extent thus far described is substantially identical with that employed in the commercial EXTRACTOR trap described above.

In accordance with the present invention, drain 62 is modified in the manner to be described so as to provide for continuous weepage or drainage under pressure, and to provide facility for unblocking such uncontinuous drainage in the event of accumulation of debris. More specifically, an orifice 90 is formed in head 76 coaxially with passage 74 and connects passage 74 directly to the sump formed by depression 60. A wire 84 extends through drain passage 74 and orifice 90, and is bent at right angles at the end 86 within sump 60 to prevent removal of wire 84 therefrom. The T-shaped head 88 of wire 84 remote from sump 60 has a pair of opposite reverse bends to facilitate rotation of wire 84 within passage 74 and orifice 90. In a working embodiment of the invention, orifice 90 possesses a diameter of 0.052 inches, and wire 84 is formed of 0.047 diameter wire stock. Thus, a small annular passage, approximately 0.0025 inches in radial dimension, extends around wire 84 within orifice 90 and permits continuous weep-drainage of collected liquid under pressure from compressed air passing through trap 10 without substantially reducing such air pressure. In the event of collection of dirt or debris in quantities sufficient to clog such annular weep passage, head 88 of wire 84 may be grasped by an operator and rotated, with wire head 86 functioning to sweep and thereby clean a circular region of head 76 surrounding orifice 90. Thus, continuous weep-drainage during operation is provided. In the event macro drainage is desired to remove both liquid and debris, for example, drain cock 70 is turned into collar 64 as previously described. Such drainage substantially reduces air pressure.

The invention claimed is:

1. An in-line trap for removing vapor from a compressed air line or the like comprising
   a manifold including means defining an inlet and an outlet, and means between said inlet and outlet for directing incoming air downwardly from said inlet and receiving air directed upwardly toward said outlet,
   enclosure means defining an enclosed volume suspended beneath and spaced from said manifold,
   first means mounted and extending between said inlet and said enclosure means for directing incoming air downwardly into said enclosed volume, said first means including means adapted to promote coalescence of vapor in air passing therethrough into droplets,
   second means mounted and extending between said enclosure means and said outlet for directing air from said enclosed volume to said outlet,
   a drain positioned in a lower portion of said enclosed volume for draining liquid collected therein, said drain comprising a drain collar threaded into a lower wall of said enclosure means, a drain cock including a hollow tubular body threaded into said drain collar with a drain passage extending axially through said body and an open orifice at an axial end of said body connecting said passage to said enclosed volume, a lateral opening in said tubular body which cooperates with said drain passage to provide a drain path, and complementary conical seats on said body and collar to seal drainage through said path, drainage through said orifice and passage remaining open, and
   a wire extending axially through said passage and through said orifice, a right-angle bend on an end of said wire within said enclosure means for preventing removal of said wire through said orifice, and a T-shaped handle on an end of said wire external to said enclosure volume for facilitating rotation of said wire, said wire being selectively rotatable within said passage and orifice such that said right-angle bend sweeps the end of said orifice which opens into said enclosed volume for removing debris collected at said orifice and thereby unplugging said orifice and passage.

2. The trap set forth in claim 1 wherein said lower wall includes a depression forming a sump, and wherein said drain is disposed in said sump.

3. The trap set forth in claim 2 wherein cross-sectional dimension to air flow in said enclosure means is substantially greater than with said first means, such that air velocity is reduced within said enclosure means and vapor droplets fall by gravity and centrifugal force toward said lower wall.

4. The trap set forth in claim 3 further comprising a porous structure positioned to occupy a lower portion of said enclosure volume and having passages for admitting liquid droplets, said passages cooperating with said enclosure means and with each other for substantially preventing air flow through said porous structure so as to define a zone of substantially zero air movement.

5. The trap set forth in claim 4 wherein said porous structure comprises an integral honeycomb structure having passages which extend downwardly within said volume to said lower wall.

6. The trap set forth in claim 5 wherein said passages are angulated in a direction opposed to air flow within said enclosure.

7. An in-line trap for removing vapor from a compressed air line or the like comprising a manifold including an inlet, an outlet, means for directing incoming air downwardly from said inlet and means for receiving air directed upwardly toward said outlet, enclosure means defining an enclosed volume suspended beneath and spaced from said manifold, said enclosure means including a bottom wall with a depression forming a sump, first means mounted and extending between said inlet and said enclosure means for directing incoming air downwardly into said enclosed volume, said first means including means for promoting coalescence of vapor in air passing therethrough into droplets, second means mounted and extending between said enclosure means and said outlet for directing air from said enclosed volume to said outlet, a drain including a drain collar threadably received in said bottom wall so as to open into said sump, said collar including a central passage which is internally threaded at one end and enlarged at a second end adjacent to said sump, a draincock including a hollow tubular body threaded into said drain collar central passage, a drain passage extending axially through said body, an enlarged head positioned within said sump and a lateral passage adjacent to said enlarged head connecting said drain passage to said enlarged portion of said central passage, said enlarged head and a portion of said collar adjacent thereto including complementary conical seats, and an open orifice extending axially from said drain passage into said enclosed volume, and a wire having a central body extending through said drain passage and said orifice, a right angle bend at an end of said wire within said volume and a T-shaped head on an end of said wire remote from said volume, said orifice being of sufficient dimension to permit rotation of said wire.

\* \* \* \* \*